(12) United States Patent
Qian et al.

(10) Patent No.: US 8,912,776 B2
(45) Date of Patent: Dec. 16, 2014

(54) CONTROL CIRCUIT OF A DC/DC CONVERTER AND THE METHOD THEREOF

(75) Inventors: Ouyang Qian, Hangzhou (CN); Wei Yuan, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 166 days.

(21) Appl. No.: 13/572,859

(22) Filed: Aug. 13, 2012

(65) Prior Publication Data

US 2013/0038302 A1   Feb. 14, 2013

(30) Foreign Application Priority Data

Aug. 12, 2011   (CN) .......................... 2011 1 0233802

(51) Int. Cl.
*G05F 1/00* (2006.01)
*H02M 3/156* (2006.01)
(52) U.S. Cl.
CPC .................................... *H02M 3/156* (2013.01)
USPC ......................................................... 323/282

(58) Field of Classification Search
USPC .......... 323/271, 282, 283, 284, 285, 326, 272
See application file for complete search history.

(56) References Cited

U.S. PATENT DOCUMENTS 6,366,070 B1 *   4/2002   Cooke et al. ................... 323/284
2004/0257056 A1 * 12/2004   Huang et al. ................... 323/282

* cited by examiner

*Primary Examiner* — Gary L Laxton
*Assistant Examiner* — Trinh Dang
(74) *Attorney, Agent, or Firm* — Perkins Coie LLP

(57) ABSTRACT

A control circuit of a DC/DC converter, wherein the DC/DC converter further comprises a high-side switch and a low-side switch, and wherein the DC/DC converter provides an output signal to a load. The control circuit comprises: an amplifier configured to receive a feedback signal and a reference signal to provide an error signal; a ramp generator configured to provide a ramp signal; a comparator configured to receive the ramp signal and the error signal to provide a comparison signal; and a COT generator configured to receive the comparison signal, to provide a COT signal to control the high-side switch and the low-side switch.

9 Claims, 4 Drawing Sheets

US 8,912,776 B2

CONTROL CIRCUIT OF A DC/DC CONVERTER AND THE METHOD THEREOF

CROSS-REFERENCE TO RELATED APPLICATION(S)

This application claims priority to and the benefit of Chinese Patent Application No. 201110233802.3, filed Aug. 12, 2011, which is incorporated herein by reference in its entirety.

TECHNICAL FIELD

The present disclosure relates generally to electronic circuits, and more particularly but not exclusively to control circuits of DC/DC converters and the method thereof.

BACKGROUND

DC/DC converters with COT (Constant On Time) control are used widely due to quick dynamic response and simple circuit structure.

To work stably, conventional DC/DC converters with COT control need to meet certain conditions, for example, the ripple of the feedback signal should be large enough and the phase of the feedback signal should be the same with a current flowing though an inductor of the DC/DC converter. Thus, a POSCAP (Polymer Organic Semiconductor Capacitor) with high price instead of a ceramic capacitor with small size and low price should be adopted as an output capacitor of the DC/DC converter.

The present disclosure pertains to provide a control circuit to solve the stability problem of the DC/DC converter with COT control. Moreover, the dynamic response of the DC/DC converter is improved.

SUMMARY

It is an object of the present disclosure to provide a control circuit of a DC/DC converter and the method thereof to solve the stability issue of the conventional DC/DC converter with COT control, and further to improve the dynamic response of the DC/DC converter.

In accomplishing the above and other objects, there has been provided, in accordance with an embodiment of the present disclosure, a control circuit of a DC/DC converter comprising: an amplifier configured to amplify the error between an output signal of the DC/DC converter and a reference signal, or to amplify the error between a feedback signal indicative of the output signal of the DC/DC converter and the reference signal, to generate an error signal; a ramp generator configured to provide a ramp signal; a comparator configured to compare the ramp signal with the error signal to generate a comparison signal; a COT generator configured to generate a COT signal based on the comparison signal to control the power switches of the DC/DC converter.

Furthermore, there has been provided, in accordance with an embodiment of the present disclosure, a method for controlling a DC/DC converter, comprising: amplifying the difference between an output signal of the DC/DC converter and a reference signal, or amplifying the difference between a feedback signal indicative of the output signal of the DC/DC converter and the reference signal, to generate an error signal; generating a ramp signal; comparing the error signal and the ramp signal to generate a comparison signal; and generating a COT signal based on the comparison signal to control the power switches of the DC/DC converter.

In one embodiment, the amplifier is configured to solve the stability issue of the conventional DC/DC converter with COT control. The dynamic response is improved because that the decreasing speed of ramp signal is proportional to the magnitude of the error signal.

The use of the same reference label in different drawings indicates same or like components.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure can be practiced without one or more of the specific details. In other instances, well-known details are not shown or described to avoid obscuring aspects of the disclosure.

Some embodiments are described with reference to FIGs in the present disclosure.

Figure 1:
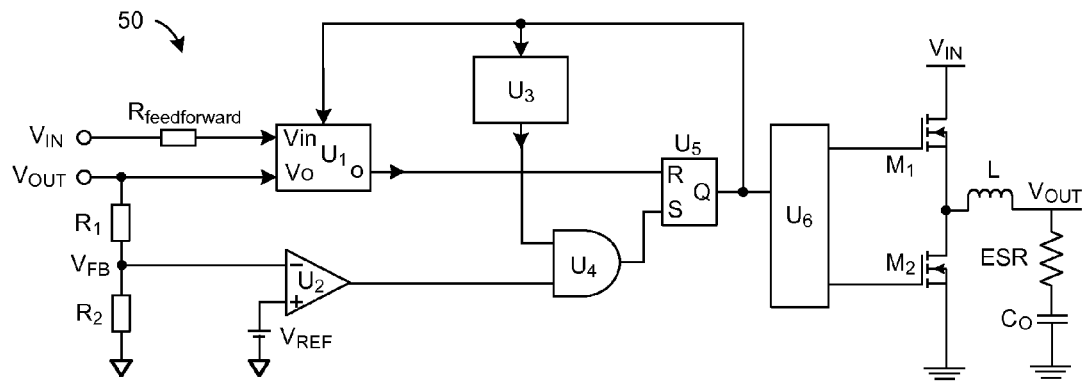
FIG. 1 schematically shows a conventional DC/DC converter 50 with COT control.

FIG. 1 schematically shows a conventional DC/DC converter 50 with COT control.

As shown in FIG. 1, a timer U1 has a first input terminal, a second input terminal, a third input terminal and an output terminal, wherein the first input terminal is configured to receive an input signal $V_{IN}$ of the DC/DC converter 50 via a forward resistor $R_{feedforward}$, the second input terminal is configured to receive an out signal $V_{OUT}$ of the DC/DC converter 50, and the output terminal provides a timing signal. A feedback circuit comprising resistors R1 and R2 coupled in series between the output signal $V_{OUT}$ and a ground node generates a feedback signal $V_{FB}$ at the connection node of the resistor R1 and R2 indicative of the output signal $V_{OUT}$. A comparator U2 has an inverting input terminal, a non-inverting input terminal and an output terminal, wherein the inverting input terminal is configured to receive the feedback signal $V_{FB}$ and the non-inverting input terminal is configured to receive a reference signal $V_{REF}$. In one embodiment, the feedback circuit is omitted and the inverting terminal of the comparator U2 receives the output signal $V_{OUT}$. The output terminal of the comparator U2 is coupled to a first input terminal of an AND gate U4. An output terminal of the AND gate U4 is coupled to a set terminal of a RS flip-flop U5. A reset terminal of the RS flip-flop U5 is coupled to the output terminal of the timer U1 to receive the timing signal. An output terminal of the RS flip-flop U5 is coupled to an input terminal of a driver U6, a third input terminal of the timer U1 and an input terminal of a minimum off time circuit U3. An output terminal of the minimum off time circuit U3 is coupled to a second input terminal of the AND gate U4. The driver U6 generates two output signals to respectively control a high-side switch M1 and a low-side switch M2. In other words, control terminals of the switches M1 and M2 are respectively configured to receive the output signals of the driver U6. The high-side switch M1 and the low-side switch M2 are coupled in series between the input signal $V_{IN}$ and the ground node. Persons of ordinary skill in the art should know that the switches M1 and M2 may comprise semiconductor devices, e.g. MOSFET, Bipolar device and so on. As shown in FIG. 1, an inductor L, a resistor ESR, and an ideal output capacitor Co are coupled between the connection node of the switches M1 and M2 and the ground node, wherein the resistor ESR is the equivalent impedance of the ideal output capacitor Co. The output signal $V_{OUT}$ is provided at the connection node of the inductor L and the resistor ESR.

During the operation of the DC/DC converter 50, when the feedback signal $V_{FB}$ is lower than the reference signal $V_{REF}$, the output signal of the comparator U2 is logical high. If the output signal of the minimum off time circuit U3 is logical high too, the AND gate U4 generates a logical high signal to set the RS flip-flop U5 and the output signal Q of the RS flip-flop U5 becomes logical high. Thus, the output signals of the driver U6 turn ON the high-side switch M1 and turn OFF the low-side switch M2. As a result, the output signal $V_{OUT}$ increases. The output signal of the comparator U2 becomes logical low until the feedback signal $V_{FB}$ goes larger than the reference signal $V_{REF}$ due to the increase of the output signal $V_{OUT}$. Then the output signal of the AND gate U4 becomes logical low while the output signal Q of the RS flip-flop U5 maintains logical high. The timer U1 receives the signal Q and starts timing once the signal Q becomes logical high. When the timer U1 times to reach a preset value, e.g. $N \times V_{IN}/V_{OUT}$, the timer U1 provides a logical high signal to reset the RS flip-flop U5. Then the output signal Q of the RS flip-flop flips to be logical low. As a result, the high-side switch M1 is turned OFF and the low-side switch M2 is turned ON; and the output signal $V_{OUT}$ of the DC/DC converter decreases. The minimum off time circuit U3 limits the minimum OFF time of the high-side switch M1. When high-side switch M1 is turned OFF, the minimum off time circuit U3 generates a logical low output signal to the AND gate U4 to block the output signal of the comparator U2. The length of the low output signal of the minimum off time circuit U3 is defined as a minimum off time and could be adjusted in difference applications. During the minimum OFF time, the output signal of the comparator U2 is blocked and the high-side switch M1 keeps OFF. When the feedback signal $V_{FB}$ decreases to be lower than the reference signal $V_{REF}$, the output signal of the comparator U2 becomes logical high. If the minimum OFF time is over, the logical high output signal of the comparator U2 sets the RS flip-flop U5 to turn ON the high-side switch M1 and the operation repeats.

In a conclusion, the timer U1, the minimum off time circuit U3, the AND gate U4 and the RS flip-flop U5 constitute a COT generator. The COT generator combined with the feedback circuit and the comparator U2 constitute a control circuit for the DC/DC converter 50.

Person of ordinary skill in the art should know that the minimum off time circuit U3 is configured to reduce noise and improve the performance of the DC/DC converter 50.

In one embodiment, the minimum off time circuit U3 and the AND gate U4 are omitted, and the output terminal of the comparator U2 is directly coupled to the set terminal of the RS flip-flop U5.

Figure 2:
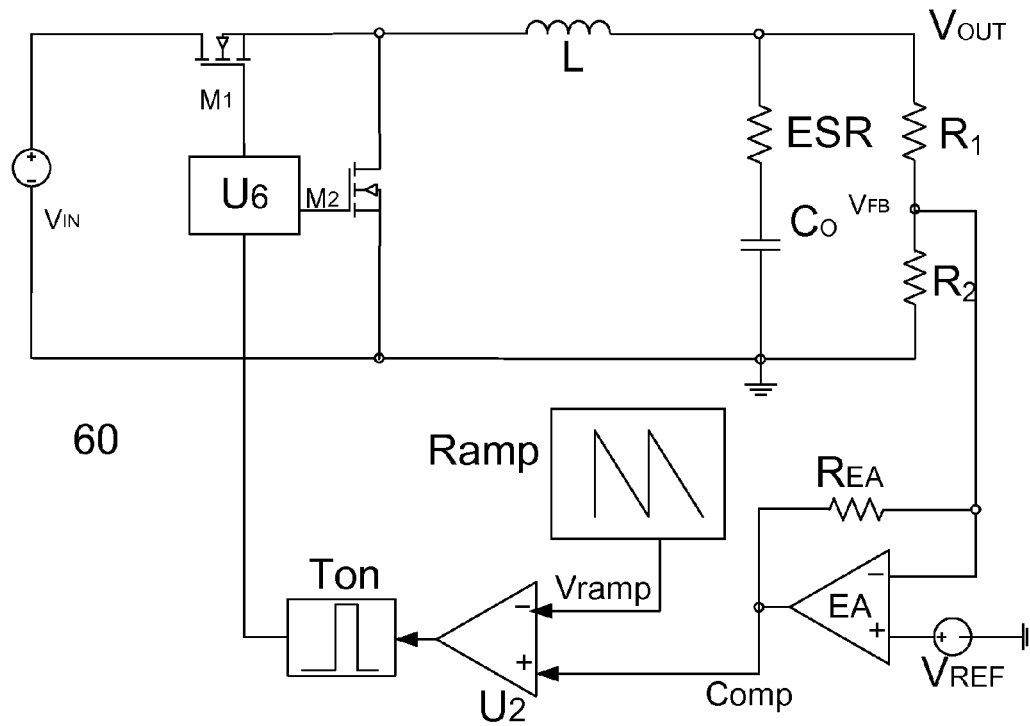
FIG. 2 schematically shows a DC/DC converter 60 with COT control in accordance with an embodiment of the present disclosure.

FIG. 2 schematically shows a DC/DC converter 60 with COT control in accordance with an embodiment of the present disclosure.

Compared to the control circuit in FIG. 1, the control circuit of DC/DC converter 60 further comprises an amplifier EA and a ramp generator RAMP. The amplifier EA has an inverting input terminal configured to receive the feedback signal $V_{FB}$, and a non-inverting terminal configured to receive the reference signal $V_{REF}$, wherein based on the feedback signal $V_{FB}$ and the reference signal $V_{REF}$, the amplifier EA provides an error signal to the non-inverting terminal of the comparator U2. The ramp generator RAMP provides a ramp signal to the inverting terminal of the comparator U2. In other words, the comparator U2 in FIG. 2 compares the ramp signal with the error signal instead of comparing the feedback signal $V_{FB}$ with the reference signal $V_{REF}$. A resistor $R_{EA}$ coupled between the inverting input terminal and the output terminal of the amplifier EA is familiar to persons of ordinary skill in the art and is not described here for brevity.

When the ramp signal is lower than the error signal, the output signal of the comparator U2 is logical high, resulting in a COT generator Ton generating a COT signal to turn ON the high-side switch M1 and to turn OFF the low-side switch M2 for a constant ON time. At the end of the constant ON time, the high-side switch M1 is turned OFF and the low-side switch M2 is turned ON.

The ON time of the high-side switch M1 is also referred as the ON time of the DC/DC converter and the OFF time of the high-side switch M1 is also referred as the OFF time of the DC/DC converter.

When the ramp signal is higher than the error signal, the output signal of the comparator U1 is logical low, and the COT generator Ton is in an idle state.

In one embodiment, the falling slope of the ramp signal is proportional to the magnitude of the error signal. Once the ramp signal decreases to be lower than the error signal, the value of the ramp signal flips to be the sum of the error signal and an offset voltage.

Figure 3:
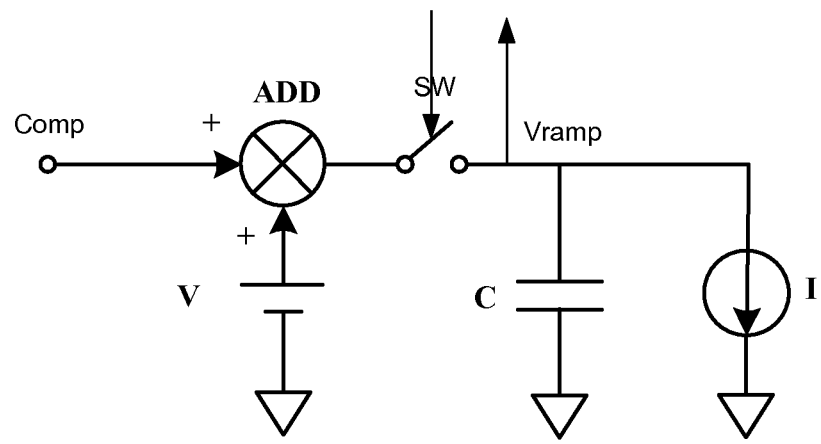
FIG. 3 schematically shows the ramp generator RAMP in accordance with an embodiment of the present disclosure.
Figure 4:
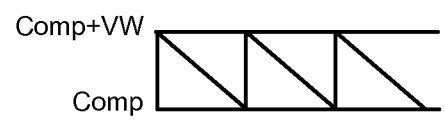
FIG. 4 shows the waveform of the ramp signal.

FIG. 3 schematically shows the ramp generator RAMP in accordance with an embodiment of the present disclosure. FIG. 4 shows the waveform of the ramp signal.

As shown in FIG. 3, the ramp generator comprises an offset voltage source V, a summing unit ADD, a switch SW, a capacitor C and a current source I, wherein the summing unit ADD has input terminals respectively coupled to the output terminal of the amplifier EA and a positive terminal of the offset voltage source V which provides an offset voltage VW, and has an output terminal coupled to a first terminal of the switch SW; a second terminal of the switch SW is coupled to an input terminal of the current source I; a negative terminal of the offset voltage source V and an output terminal of the current source I are coupled to the ground node; the capacitor C is coupled between a second terminal of the switch SW and the ground node; a control terminal of the switch SW is coupled to a switching controller. The switching controller may have a structure similar to the COT generator Ton and generates a control signal to turn ON the switch SW at the moment the output signal of the comparator U2 flips to be logical high. The ON time of the switch SW is short, e.g. 30 ns. The ramp signal Vramp is provided at the connection node of the capacitor C and the second terminal of the switch SW. The value of a current provided by the current source I is proportional to the magnitude of the error signal.

When the ramp signal Vramp decreases to be lower than the error signal, the switch SW is controlled to be ON; then the value of the ramp signal Vramp flips to be the magnitude of the output signal of the summing circuit ADD, i.e. the sum of the error signal and the offset voltage VW. In other words, the voltage across the capacitor C is equaled to the sum of the error signal and the offset voltage VW.

The switch SW is turned OFF after being ON for a while, e.g. 30 ns. Then the capacitor C is discharged by the current source I. The discharging speed is i/c, wherein i is the current provided by the current source I and c is the capacitance of the capacitor C. The voltage across the capacitor C, i.e., the ramp signal Vramp, decreases when the capacitor C is discharged. The decreasing speed of the ramp signal Vramp, i.e., the falling slope of the ramp signal Vramp, is proportional to the discharging speed i/c.

Because the value of the current provided by the current source I is proportional to the magnitude of the error signal, the decreasing speed of the ramp signal Vramp is proportional to the magnitude of the error signal, too.

As shown in FIG. 4, the value of the ramp signal Vramp decreases from the sum of the error signal and the offset voltage VW to the error signal Comp, and then back to the sum of the error signal and the offset voltage VW again. The decreasing speed of the ramp signal Vramp is proportional to the magnitude of the error signal.

As described before, the decreasing speed of the ramp signal Vramp is proportional to the error signal. The larger the magnitude of the error signal, the quicker the ramp signal Vramp decreases to the error signal Comp, resulting in a shorter interval time between the two COT signals generated by the COT generator Ton, which means that the OFF time of the high-side switch M1 is shorter.

Figure 5:
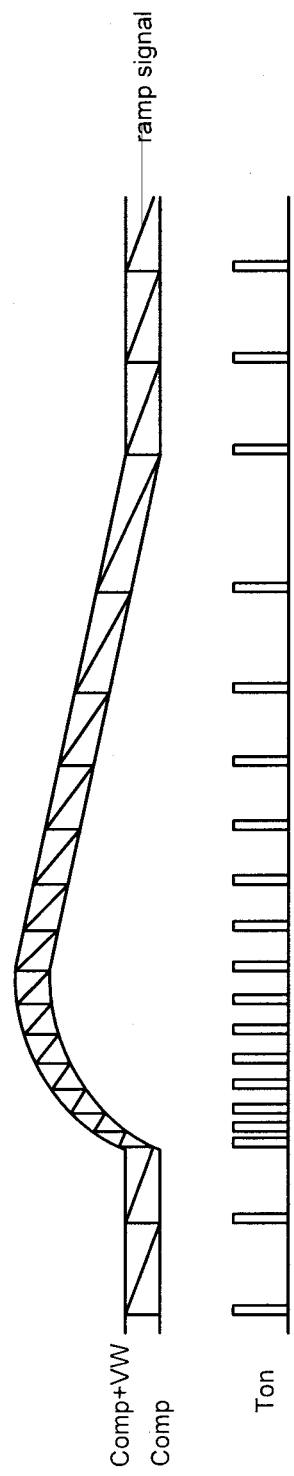
FIG. 5 shows the relationship between the decreasing speed of the ramp signal Vramp and the OFF time of DC/DC converter 60.

FIG. 5 shows the relationship between the decreasing speed of the ramp signal Vramp and the OFF time of DC/DC converter 60. The upper waveform in FIG. 5 represents the ramp signal Vramp, and the lower waveform represents the COT signal. As is seen from FIG. 5 that the faster the decreasing speed of the ramp signal Vramp, the shorter the OFF time of the DC/DC converter 60.

Compared to the conventional technique, several embodiments of the foregoing DC/DC converter have improved the dynamic response. Unlike the conventional technique, several embodiments of the foregoing DC/DC converter adopt an error amplifier and a ramp generator, which ensures that when the load increases, the output signal $V_{OUT}$ and the feedback signal $V_{FB}$ decrease, followed by the increase of the error signal. Then, the OFF time of the DC/DC converter 60 decreases and more power is supplied to the load to increase the output signal $V_{OUT}$ to the preset value. Meanwhile, several embodiments of the foregoing DC/DC converter improve the stability as the error amplifier is configured.

Figure 6:
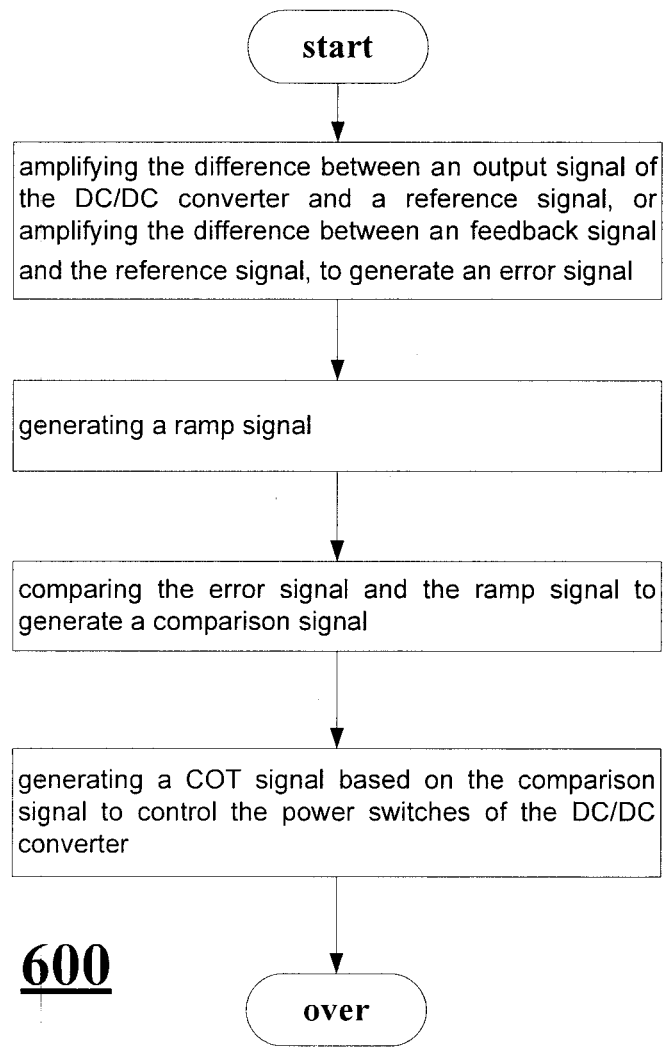
FIG. 6 shows a method 600 for controlling a DC/DC converter in accordance with an embodiment of the present disclosure.

FIG. 6 schematically shows a flowchart of a method 600 for controlling a DC/DC converter in accordance with an embodiment of the present disclosure.

As shown in FIG. 6, the method 600 comprises: step 610, amplifying the difference between an output signal of the DC/DC converter and a reference signal, or amplifying the difference between a feedback signal indicating the output signal and the reference signal, to generate an error signal; step 620, generating a ramp signal; step 630, comparing the error signal and the ramp signal to generate a comparison signal; and step 640, generating a COT signal based on the comparison signal to control the power switches of the DC/DC converter.

In each switching cycle of the DC/DC converter, the value of the ramp signal Vramp decreases from the sum of the error signal and an offset voltage to the error signal Comp, and then back to the sum of the error signal and the offset voltage VW again in a next switching cycle. The decreasing speed of the ramp signal Vramp is proportional to the magnitude of the error signal.

In one embodiment, the power switches comprises a high-side switch and a low-side switch. When the ramp signal Vramp decreases to be lower than the error signal, the comparison signal flips and a COT generator generates a COT signal to turn ON the high-side switch and to turn OFF the low-side switch for a constant ON time. The high-side switch is turned OFF and the low-side switch is turned ON at the end of the constant ON time.

An effective technique for control circuit of DC/DC converter with COT control has been disclosed. While specific embodiments of the present disclosure have been provided, it is to be understood that these embodiments are for illustration purposes and not limiting. Many additional embodiments will be apparent to persons of ordinary skill in the art reading this disclosure.

We claim:

1. A control circuit of a DC/DC converter, wherein the DC/DC converter further comprises a high-side switch and a low-side switch, and wherein the DC/DC converter provides an output signal to a load, the control circuit comprising:
    an amplifier having a first input terminal, a second input terminal and an output terminal, wherein the first input terminal is configured to receive a feedback signal indicative of the output signal, and the second input terminal is configured to receive a reference signal, wherein based on feedback signal and the error signal, the amplifier generates an error signal at the output terminal;
    a ramp generator configured to provide a ramp signal;
    a comparator having a first input terminal, a second input terminal and an output terminal, wherein the first input terminal is coupled to the ramp generator to receive the ramp signal, and the second input terminal is coupled to the amplifier to receive the error signal, and wherein based on the ramp signal and the error signal, the comparator generates a comparison signal at the output terminal;
    a COT generator having an input terminal and an output terminal, wherein the input terminal is coupled to the output of the comparator to receive the comparison signal, and wherein based on the comparison signal, the COT generator provides a COT signal at the output terminal to control the high-side switch and the low-side switch, and wherein the COT generator having a timer with a first input terminal, a second input terminal, a third input terminal and an output terminal, wherein the first input terminal is configured to receive an input signal of the DC/DC converter, the second input terminal is configured to receive the output signal of the DC/DC converter, and the third input terminal is configured to receive the COT signal, wherein based on the COT signal, the input signal and the output signal of the DC/DC converter, the timer generates a timing signal at the output terminal; and
    a first logic circuit having a first input terminal coupled to the timer to receive the timing signal, a second input terminal coupled to the comparator to receive the comparison signal, wherein based on the timing signal and the comparison signal, the first logic circuit provides the COT signal at the output terminal.

2. The control circuit of the DC/DC converter of claim 1, further comprising a driver having an input terminal, a first output terminal and a second output terminal, wherein the input terminal is coupled to the output terminal of the COT generator to receive the COT signal, and wherein based on the COT signal, the driver generates a first switching signal at the first output terminal to control the high-side switch and a second switching signal at the second output terminal to control the low-side switch.

3. The control circuit of the DC/DC converter of claim 1, further comprising a driver having an input terminal and an output terminal, wherein the input terminal is coupled to the output terminal of the COT generator to receive the COT signal, and wherein based on the COT signal, the driver generates a switching signal at the output terminal to control the high-side switch.

4. The control circuit of the DC/DC converter of claim 1, wherein in each switching cycle of the DC/DC converter, the value of the ramp signal decreases from the sum of the error signal and an offset voltage to the error signal, and then back to the sum of the error signal and the offset voltage again in the next switching cycle, and wherein the decreasing speed of the ramp signal is proportional to the magnitude of the error signal.

5. The control circuit of the DC/DC converter of claim 1, wherein the first logic circuit comprises a RS flip-flop having a set terminal, a reset terminal and an output terminal, and wherein the set terminal is coupled to the output terminal of the comparator to receive the comparison signal, the reset terminal is coupled to the output terminal to receive the timing signal, and wherein based on the comparison signal and the timing signal, the RS flip-flop provides the COT signal at the output terminal.

6. The control circuit of the DC/DC converter of claim 1, wherein the COT generator further comprises:
    a minimum off time circuit having an input terminal and an output terminal, wherein the input terminal is configured to receive the COT signal, and wherein based on the COT signal, the minimum off time circuit provides a minimum off time signal at the output terminal; and
    a second logic circuit having a first input terminal, a second input terminal and an output terminal, wherein the first input terminal is coupled to the output terminal of the comparator to receive the comparison signal, and the second input terminal is coupled to the output terminal of the minimum off time circuit to receive the minimum off time signal, and wherein the comparison signal is blocked unless the minimum off time signal indicates that a minimum OFF time of the DC/DC converter ends.

7. The control circuit of DC/DC converter of claim 4, wherein the ramp generator comprises:
    a voltage source having a positive terminal and a negative terminal, wherein the negative terminal is connected to a ground node, and wherein the voltage source provides the offset voltage at the positive terminal;
    a summing circuit having a first input terminal, a second input terminal and an output terminal, wherein the first input terminal is configured to receive the error signal, and the second input terminal is coupled to the positive terminal of the voltage source to receive the offset voltage, and wherein the summing circuit provides the sum of the error signal and the offset voltage at the output terminal;
    a switch having a first terminal, a second terminal and a control terminal, wherein the first terminal is coupled to the output terminal of the summing circuit to receive the sum of the error signal and the offset voltage;
    a capacitor having a first terminal and a second terminal, wherein the first terminal is coupled to the second terminal of the switch, and the second terminal is connected to the ground node, and wherein the capacitor provides the ramp signal at the first terminal; and
    a current source coupled in parallel to the capacitor to discharge the capacitor.

8. The control circuit of the DC/DC converter of claim 6, wherein the second logic circuit comprises an AND gate having a first input terminal, a second input terminal and an output terminal, wherein the first input terminal is coupled to the output terminal of the comparator to receive the comparison signal, and the second input terminal is coupled to the output terminal of the minimum off time circuit to receive the minimum off time signal, and wherein the comparison signal is blocked unless the minimum off time signal is logical high.

9. The control circuit for DC/DC converter of claim 7, wherein the switch is controlled by a control signal, and wherein the control signal has a short pulse to turn ON the switch when the high-side switch is turned ON.

* * * * *